US007607843B2

(12) United States Patent
Gluck

(10) Patent No.: US 7,607,843 B2
(45) Date of Patent: *Oct. 27, 2009

(54) IMAGE SYSTEM AND METHOD

(75) Inventor: Adrian Gluck, Irvine, CA (US)

(73) Assignee: Media Technologies Licensing LLC, Beverly Hills, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 11/456,689

(22) Filed: Jul. 11, 2006

(65) Prior Publication Data

US 2006/0256377 A1    Nov. 16, 2006

Related U.S. Application Data

(63) Continuation of application No. 10/791,625, filed on Mar. 1, 2004, now Pat. No. 7,077,581, which is a continuation of application No. 10/231,654, filed on Aug. 29, 2002, now Pat. No. 6,698,943, which is a continuation of application No. 08/955,484, filed on Oct. 22, 1997, now Pat. No. 6,532,345, which is a continuation-in-part of application No. 08/607,582, filed on Feb. 27, 1996, now abandoned, which is a continuation-in-part of application No. 08/284,783, filed on Aug. 2, 1994, now abandoned.

(51) Int. Cl.
*G03B 17/00* (2006.01)

(52) U.S. Cl. .................... 396/427; 396/429; 348/157

(58) Field of Classification Search ............. 396/427, 396/429; 348/57, 159, 207.1, 207.11, 211.3, 348/231.3, 157

See application file for complete search history.

(56) References Cited

U.S. PATENT DOCUMENTS 5,343,386 A    8/1994  Barber (Continued)

FOREIGN PATENT DOCUMENTS

CH           628192         2/1982
EP         0534712 A1       3/1993

OTHER PUBLICATIONS

Panos G. Michalopoulos, Richard D. Jacobson, Craig A. Anderson and Thomas B. Debruycker, "Automatic Incident Detection Through Video Image Processing", Autoscope-Traffic Engineering + Control, Feb. 1-19, 1993.

*Primary Examiner*—W B Perkey
(74) *Attorney, Agent, or Firm*—Barlow, Josephs & Holmes, Ltd.

(57) ABSTRACT

There are described herein systems and methods for producing and distributing personalized photographic souvenirs for spectators of an event. Equipment well-known in the art is used to take photographs of performers at the event, and to scan images or take photos of items representative of the event, for example a ticket stub, advertisement, or team names and logos. In addition, at least one pan-and-tilt camera system, also well-known in the art, is used to take an orderly, indexed series of photos of the spectators such that substantially every spectator will appear in at least one spectator photo. The spectator photos are indexed according to a predetermined mapping algorithm, which maps a particular location of the venue to a virtual sector. Individual souvenirs are then created at the venue in a centralized processing location, by organizing and combining a spectator photo with the other photos and/or scanned images. The souvenirs are then distributed to vendors who then present them to spectators in the sector or sectors from where the spectator photo was taken. The souvenirs may also be available to the spectator from the centralized processing location.

21 Claims, 5 Drawing Sheets

U.S. PATENT DOCUMENTS

| | | |
|---|---|---|
| 5,499,146 A | 3/1996 | Donahue et al. |
| 5,576,838 A | 11/1996 | Renie |
| 5,598,208 A | 1/1997 | McClintock |
| 5,655,053 A | 8/1997 | Renie |
| 5,666,215 A | 9/1997 | Fredlund et al. |
| 5,694,514 A | 12/1997 | Evans et al. |
| 5,751,885 A | 5/1998 | O'Loughlin et al. |
| 5,838,457 A | 11/1998 | Umemoto |
| 5,946,444 A * | 8/1999 | Evans et al. .................... 386/46 |
| 6,038,365 A | 3/2000 | Yamagami |
| 6,313,875 B1 | 11/2001 | Suga et al. |
| 6,532,345 B1 | 3/2003 | Gluck |
| 6,549,306 B2 | 4/2003 | Fredlund et al. |
| 6,698,943 B2 | 3/2004 | Gluck |
| 7,301,558 B2 * | 11/2007 | Gluck ........................ 348/157 |
| 2001/0028399 A1 | 10/2001 | Conley |

* cited by examiner

IMAGE SYSTEM AND METHOD

CROSS REFERENCE TO RELATED APPLICATIONS

This application is a continuation of U.S. patent application Ser. No. 10/791,625, filed Mar. 1, 2004, now U.S. Pat. No. 7,077,581, which is a continuation of U.S. patent application Ser. No. 10/231,654, filed Aug. 29, 2002, now U.S. Pat. No. 6,698,943, which is a continuation of U.S. patent application Ser. No. 08/955,484 filed Oct. 22, 1997, now U.S. Pat. No. 6,532,345, which is a continuation-in-part of U.S. patent application Ser. No. 08/607,582, filed Feb. 27, 1996 now abandoned, which is a continuation-in-part of U.S. patent application Ser. No. 08/284,783, filed Aug. 2, 1994, now abandoned. Priority to the above-mentioned prior applications is hereby expressly claimed, and the disclosures of the above-mentioned prior applications are each hereby incorporated by reference.

FIELD OF THE INVENTION

This invention relates in general to photography, and more particularly to systems and methods for producing and distributing personalized photographic souvenirs for spectators of an event.

BACKGROUND OF THE INVENTION

Observing live action events such as sports games, concerts, conventions, rallies, plays, and the like, is a major pastime. Many spectators attending these events consider them to be memorable and as such the spectators often take photographs of the events. Unfortunately, these photographs typically show only the action and not the spectator, or only the spectator and not the action. This results in obtaining a souvenir that for all practical purposes is no different than commercially available pictures and trading cards, or published photos of the event in magazines and newspapers. In addition, many spectators simply do not take photos at all, due to difficulty in carrying the necessary equipment, accessing a suitable photo-taking location at the venue, lack of suitable zoom lenses, prohibition by the venue owners, etc.

Since attending live events is usually a source of pride and joy which many people want to share with relatives and friends, it would be desirable for a spectator to have a personalized souvenir that indicates positively that the spectator did indeed attend the event.

SUMMARY OF THE INVENTION

An object of the present invention is to provide an improved form of a personalized souvenir for a spectator at a live event.

Another object is to use photographs and/or scanned images of performers at the live event, photographs and/or scanned images of items representative of the event (e.g. a ticket stub, advertisement, or team names and logos), and photos of the spectators, to form the personalized souvenir.

Another object is to provide methods of obtaining the necessary photographs and/or scanned images and preparing the souvenirs such that the souvenirs can be distributed to spectators during or soon after the live event, at or near the site of the live event.

These and other objects are accomplished by the creation of personalized souvenirs which include real life photos, including photos of the spectators, to create an effect on the spectators known as "telepresence." That is, the spectators at a later time will typically be able to recall the event in a more realistic sense than if they looked at other souvenirs or photos which did not include photos of themselves combined with photos and memorabilia from the live event.

The systems and methods of the present invention use at least one pan-and-tilt camera system located at the event which takes an orderly, indexed series of photos of the spectators preferably soon after the start of the event, such that substantially every spectator will appear in at least one spectator photo. The spectator photos are indexed according to a predetermined mapping algorithm which maps a particular location of the event venue to a virtual sector (so called because the sector boundaries may not necessarily correspond to physical sections at the venue). Individual souvenirs are then created at a centralized souvenir assembly site, by organizing and combining a spectator photo with the other photos and/or scanned images. The souvenirs are then distributed to vendors who then present them to spectators in the sector or sectors from where the spectator photo was taken. The souvenirs may also be available to spectators from the centralized assembly site. Truly personalized souvenirs of attendance at the event are thus provided for large numbers of spectators, who may obtain the personalized souvenirs in a relatively quick and easy manner while still at the event venue.

Other objects of the present invention will be apparent from the detailed description which follows, when read in conjunction with the drawings.

BRIEF DESCRIPTION OF THE DRAWING FIGURES

DETAILED DESCRIPTION OF A PREFERRED EMBODIMENT

Figure 1:
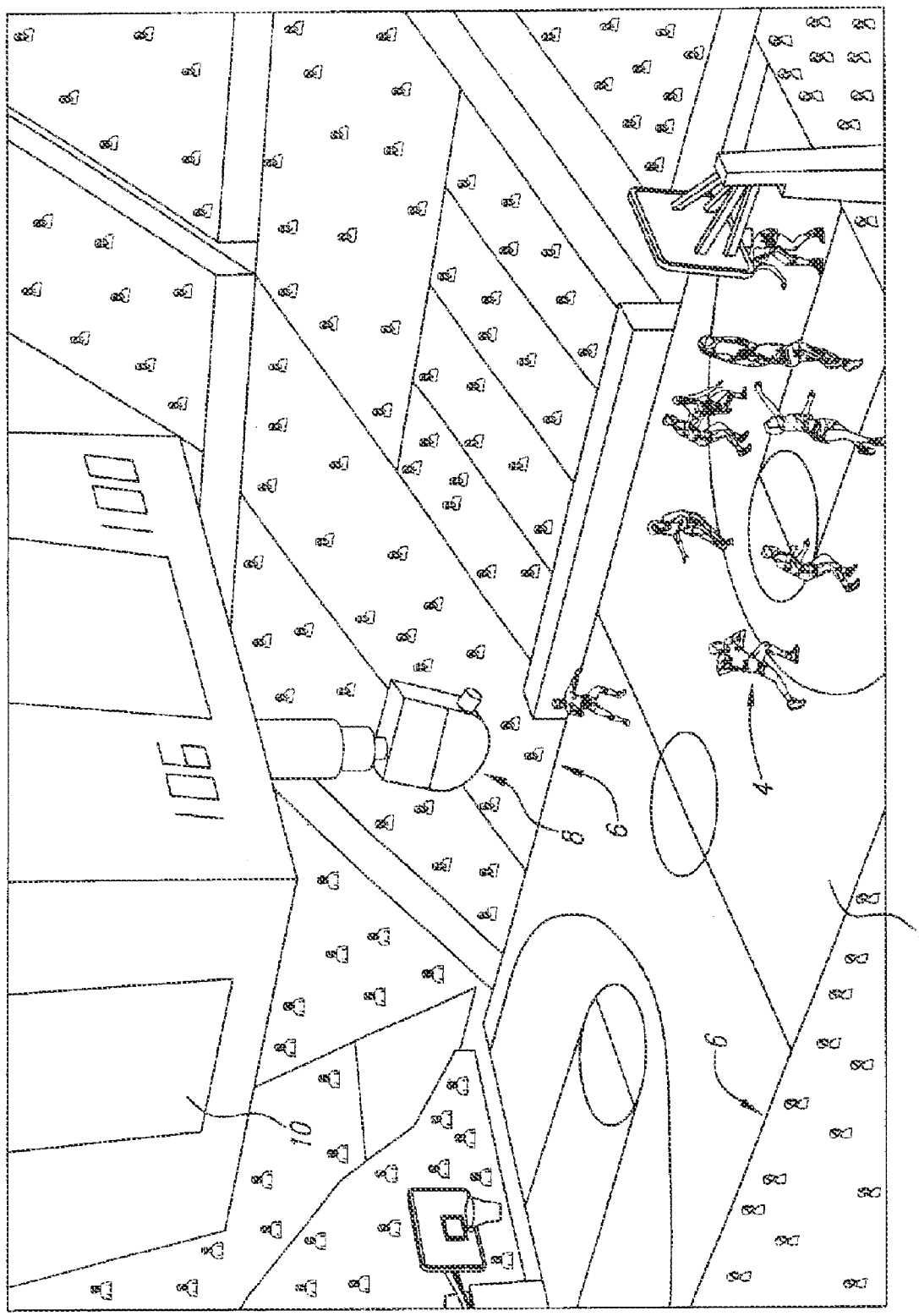
FIG. 1 shows a typical venue of a live event (a basketball game) illustrating a pan-and-tilt camera system attached to the scoreboard above the center of the court.
Figure 7:
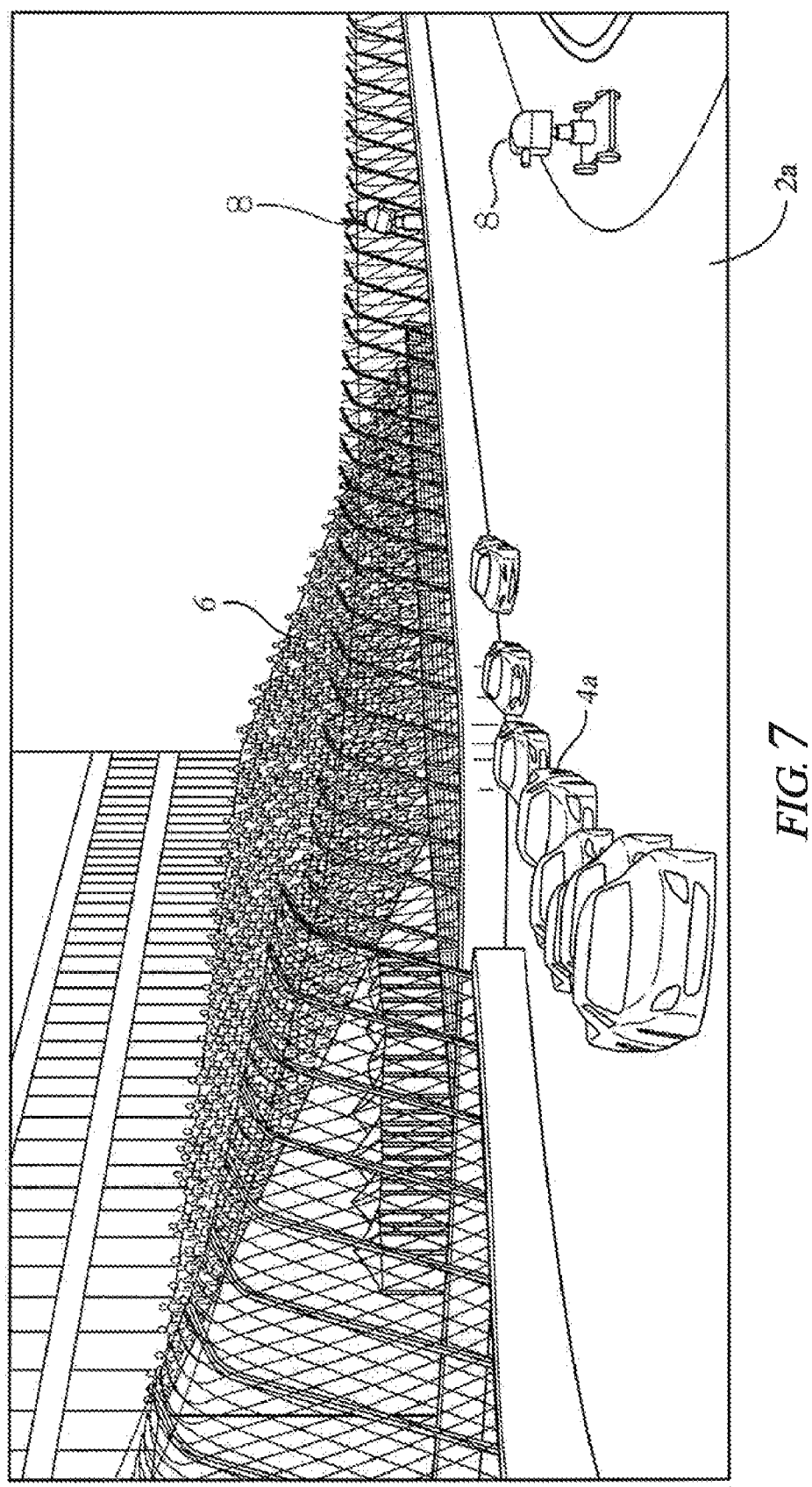
FIG. 7 shows a typical venue of a live-action race event illustrating a remotely controlled mobile camera system.

FIG. 1 shows a basketball court 2, during a basketball game, with players 4 on the court 2. Spectators 6 are seated in the stands in a usual manner throughout the venue. A pan- and tilt camera system 8, well-known in the art, is attached to and positioned under the scoreboard 10. Due to the design of typical gymnasiums, this location of the camera system 8 is preferred as it is in essentially the center of the court 2, and therefore would typically be capable of taking photos of substantially all of the spectator seats without being obstructed. For other venues where such a placement is not available, the camera system 8 may be placed at other suitable locations, and/or there may be more than one camera system 8 to enable coverage of substantially all of the spectators. For example, at a football game, the camera system 8 or systems may be placed on the goalposts, or attached to various strategic locations in the grandstands. At a baseball field the camera system 8 or systems may be attached to the foul poles, the fences, the home-run wall, etc. At a race track, such as shown in FIG. 7, the camera system 8 or systems may be mounted to the guardrails (see FIG. 7), or stationed in the center of the track. These and other venues may require the camera system 8 or systems to be mobile (see FIG. 7). For example, on golf courses, the camera system 8 or systems could be mounted to mobile units, or hand-carried. Alternatively, the camera system 8 or systems may be located in a tethered balloon, low-flying low-speed aircraft, a blimp, a helicopter, radio-controlled hang-gliders, etc. In addition, the camera system 8 or systems may be mounted directly to structures as described, or they may be mounted to telescopic brackets which in turn are mounted to the structures. The important feature of the location of the camera system 8 or systems is that they are capable of taking photographs of substantially all of the spectators at an event. In addition, the location of the cameras, the viewing angle, the lens aperture, the exposure time, the film speed and the type of lenses are selected carefully in accordance with usual good photographic techniques in order to account for variations in light among the spectators and the stage or playing field, the amount of motion and the speed of motion in the live action and among the spectators, the distance between the camera and the stage or the playing field, and the distance between the camera and the spectators.

Figure 2:
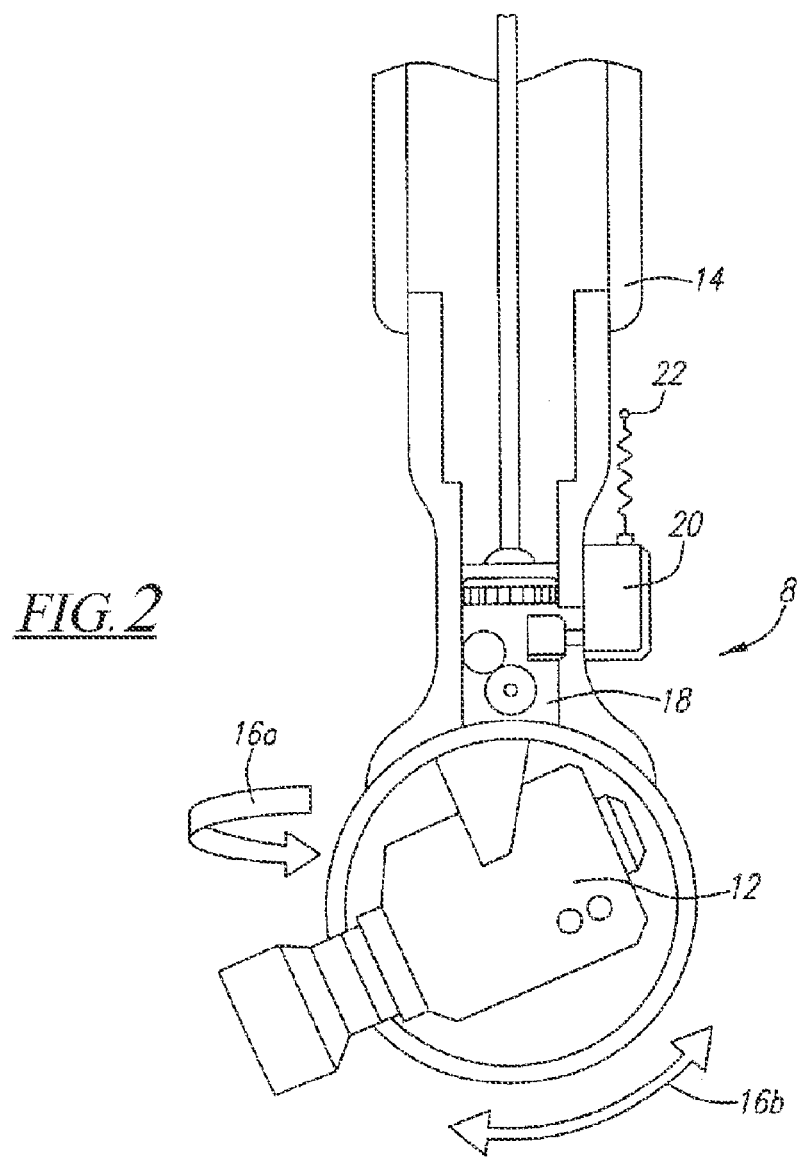
FIG. 2 shows a typical pan-and-tilt camera system used in conjunction with the present invention.
Figure 3:
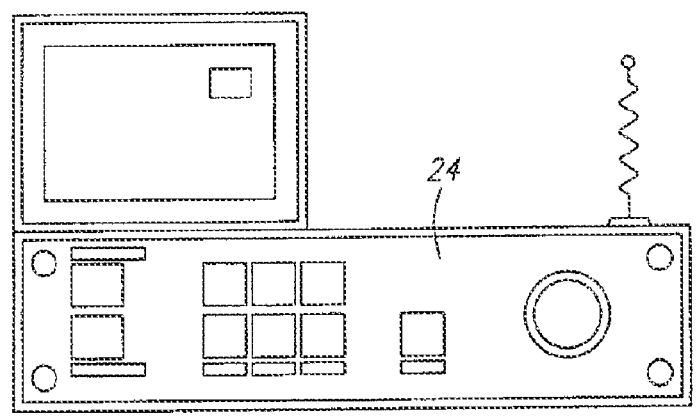
FIG. 3 shows a typical remote control unit for controlling the pan-and-tilt camera system.

FIG. 2 is an illustration of a typical pan-and-tilt camera system 8 used in conjunction with the present invention. The camera system 8 includes a camera 12 mounted to a camera support 14 which in turn may be mounted to a physical structure such as a goalpost or grandstand as previously described. The camera 12 has the ability to pan and tilt, as indicated by arrows 16a and 16b respectively, thus allowing the camera 12 to capture images of surroundings at 360.degree. horizontally and up to 90.degree. vertically. The camera system 8 also includes a motion control motor 18 and an R.F. control box 20 with an antenna 22, so that the system 8 may be controlled by an R.F. remote control unit 24 as shown in FIG. 3. The camera system 8 and the control unit 24 shown in FIG. 2 and FIG. 3 respectively illustrate typical hardware well-known in the art, for example the camera system 8 may include a Sony DKC ST5 with flash trigger and/or spot-lighting capability, mounted on a cable-driven NS microwave model CD-20 mast with quickset QPT-90 pan and tilt, but it is understood that other camera systems and control units well-known in the art may be used without departing from the concepts of the present invention. Computer software drives the camera system 8 as will be discussed shortly.

The camera system 8 or systems may be operated manually or by remote control which is operated either manually or is driven by computer software. This includes panning, tilting, raising, lowering, zooming, and actual photo taking. If artificial light is needed, such lighting may be provided by strobe lighting systems pre-installed at the venue, flash units, high intensity spot light projectors, or any other suitable means. Such lighting devices may be hand-held and manually operated, or operated by remote control, or even computer driven. They can be mounted permanently, carried by operators, mounted onto the same brackets as the camera 12 or cameras, or mounted onto separate brackets. It is desirable that whatever the arrangement, the lighting over an entire sector being photographed should be as even as possible.

Figure 4:
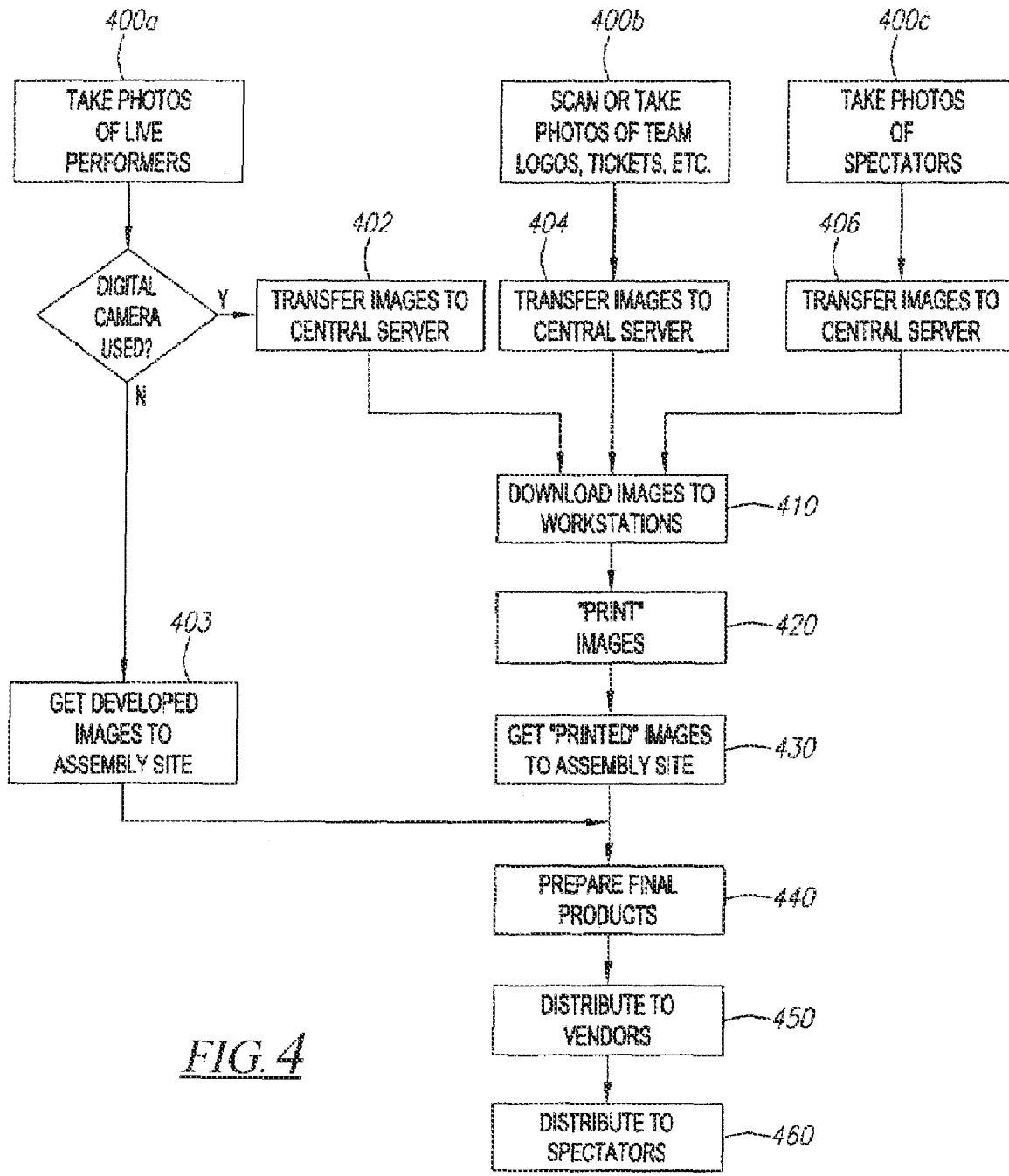
FIG. 4 is a flow-chart showing how the photos and other images are routed to a central system server and then downloaded to workstations where they are manipulated and combined to form the finished products, which are then distributed.

The equipment previously described, in conjunction with other hardware and software to be described herein, is used in accordance with the present invention to produce personalized souvenirs for spectators at live events. Turning to FIG. 4, it can be seen that photo and image data from multiple sources (at steps 400a, 400b, and 400c) are sent to a central computer server, then distributed to various workstations where the data is manipulated, printed, and combined to form the finished products—personalized souvenirs. The central server is any computer well-known in the art capable of processing large amounts of data, for example a Macintosh Apple Power PC with at least 120 to 180 megabytes of RAM, running TEPS-1000 software.

The various photos and images at steps 400a, 400b, and 400c are gathered independently of each other, and may therefore be gathered at the same time. At step 400a, one or more photographers takes photographs of the performers (athletes, singers, actors, etc.) in a usual manner during the course of the event, preferably near the start of the event to allow enough time for processing the photos and creating and distributing the souvenirs. A digital camera, such as a Fuji DS-300 well-known in the art, is preferred, so that the images captured can be transmitted at step 402 to the central server after a photograph or group of photographs is taken. The images may be transported to the central server by a disc or cartridge, or transmitted via cable, wire, radio, infrared, or satellite, or any other means. If the camera or cameras used to take the photographs at step 400a are traditional analog type cameras, then instead of transferring the captured images to a computer server, the captured images are transported at step 403 in the form of undeveloped film to a film processing laboratory where they may then be scanned into the central server, or delivered as developed images to the souvenir assembly site.

At step 400b, photos are taken of admission tickets, event ads, team logos, names, predetermined slogans (e.g., "I was there!"), and/or other predetermined items indicative of the event, or said items may be scanned into a computer memory or permanent storage device. Other possible items or slogans include: a border of some appealing design to match the theme of the event; the time and/or the date of the event; the location where the event took place; an enlarged photo-within-the-photo so that a selected spectator or group of spectators can be seen more clearly; an arrow or a similar indicator connecting the actual spectator location in the photograph to the photo-within-the photo; a "halo" or similar indicator around the actual spectator location in the photograph to enable the viewer to locate the spectator more quickly; or even the name of the spectator. This will increase the informational content and hence increase the telepresence effect of the entire moment at a later date.

If cameras are used to capture these images, a digital camera such as the Fuji DS-300 may be used. If the images are scanned, scanners well-known in the art, for example a high resolution Hewlett Packard HP 4 Scanjet 4P, may be used. These images are then transported at step 404 to the central server by a disc or cartridge, or transmitted via cable, wire, radio, infrared, or satellite, or any other means, similar to step 402.

Still referring to FIG. 4, and turning now to step 400c, clear, in-focus photographs are taken of substantially all of the area of the venue designed for spectators. Using the equipment described in conjunction with FIGS. 1-3, the camera system 8 or systems are controlled by computer software in which the venue has been mapped into predetermined sectors. The sectors may be based on physical boundaries within the venue, the characteristics of the camera system 8 or systems, such as shutter speeds, focal lengths, etc., or any other factors, but the ultimate goal is to define an area as a sector so that a single photograph may be taken of the sector which includes clear, in-focus views of substantially all spectators in that sector.

Figure 5:
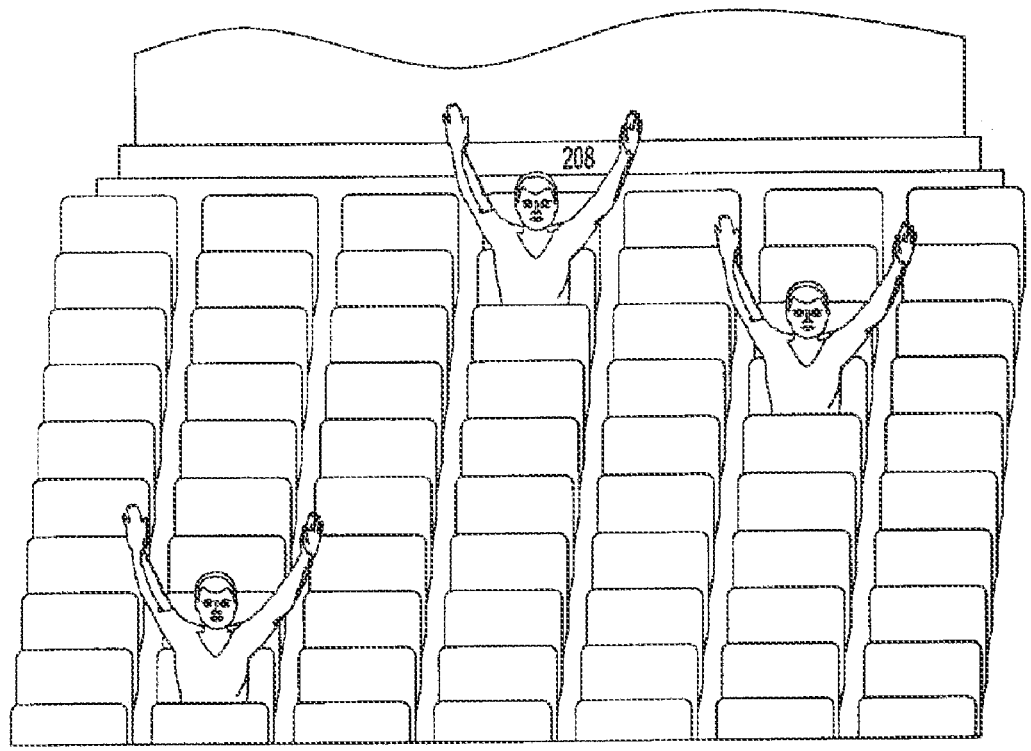
FIG. 5 is a copy of an actual photograph taken during an experiment with the systems and methods of the present invention.

The determination of how big an area constitutes a single sector will usually require on site calibration and testing of the equipment prior to the event. At a particular venue, however, once the system is calibrated and the sectors are mapped out, the settings will usually be accurate for future events. Once the venue has been mapped into these virtual sectors, such a mapping is programmed into software that is used to control the camera system 8 or systems. For venues that provide seating, a sector will typically contain from fifty to one thousand seats. For example, FIG. 5 is a copy of an actual photograph taken at a major sports venue during experimentation with the system and methods of the present invention. At this venue, it was determined that a sector corresponded to an actual physical section of the venue, section 208.

Referring back to FIG. 4, it is desirable for the camera system 8 or systems to take photos of substantially all of the spectators in a reasonable time, to still allow the personalized souvenirs to be produced and distributed at the venue by vendors. Thus, certain parameters are preprogrammed into the system 8 or systems. For example, the time for the system 8 or systems to begin taking photos, the first sector to take a photo of, the sequence of additional sectors to take photos of, etc. The degree of tilting, panning, raising, lowering, focusing, etc., for each photo is preferably also preprogrammed. Of course, any preprogrammed parameters may be changed or adjusted as needed, but preferably, an operator will simply initiate the photo-taking sequence either manually or by a remote command, and then the camera system 8 or systems will execute a series of preprogrammed steps to take clear, in-focus pictures of each sector in relatively rapid, continuous succession. The sequence at a particular venue should remain the same, once the camera system 8 or systems is calibrated for that venue.

Since the sector boundaries are actually virtual boundaries as described above, it is possible, and in fact likely, that some spectator groups could be split across sectors. Thus, in addition to taking photos of each sector, it is desirable to have photos taken that cut across sector boundaries, to increase the likelihood of a group of spectators being in a single photo. Thus, once the virtual sectors have been defined for a particular venue, the camera system 8 or systems are programmed to be stepped in increments such that the series of photos will cover individual sectors, as well as combined sectors cutting across sector boundaries. The horizontal sector overlap will typically be from 10% to 70%, and the vertical overlap will typically be from 1% to 25%, depending on the venue. If the camera system 8 or systems are manually operated, then the operator will adjust accordingly to achieve substantially the same results as described with the computer-driven camera system 8 or systems. The photos taken at step 400c, as just described, are then transferred at step 406 to the central server as described above for steps 402 and 404. In each of these steps, 402, 404, and 406, transfer of the images may require the use of a booster to ensure the data is not lost or corrupted during the transfer. This is especially true of step 406 due to the large volume of data.

Once the data from steps 402, 404, and 406 are loaded into the central server, the data is then downloaded at step 410 to individual workstations. Preferably, there is one workstation for approximately every five-thousand spectators. Thus, at a venue capable of supporting twenty-thousand spectators, there would be four workstations. The workstations are well-known in the art, and may be for example a Macintosh Apple Power PC similar to the central server. The images may be manipulated at the workstations using common software, for example Adobe Photoshop, to properly size, orient, and otherwise edit the images to prepare them for the assembly into the final souvenir.

Attached to each workstation is a series of printers, preferably from one to eight printers per workstation, and more preferably from three to eight, and more preferably from five to eight. The printers are color computer printers or dye-sublimation printers or other similar photographic-quality printers well-known in the art, for example Sony UP-D8800 printers. After any editing is performed to the images as described above, the images are printed at step 420 directly to paper using the printers just described.

Still referring to FIG. 4, once the images are printed, they are all collected and brought together at step 430 to the souvenir assembly site. The central server and other hardware may or may not be at the souvenir assembly site, although it is preferred that at least the workstations and printers are at the site, along with any film processing equipment needed for processing analog type film. Thus, the images are preferably printed directly at the assembly site. In addition, the assembly site is preferably at or near the venue. Once the images are all at the assembly site, workers, and or computers prepare the final personalized souvenirs at step 440 by selecting the desired images and arranging them onto a single frame or support in a predetermined pattern. The images may be separate images combined onto a single matte or frame, or they may be edited and merged by software into a single photorealistic sheet. The images are preferably spaced apart in a predetermined manner so as to fit in a frame or matte with pre-cut windows.

Figure 6:
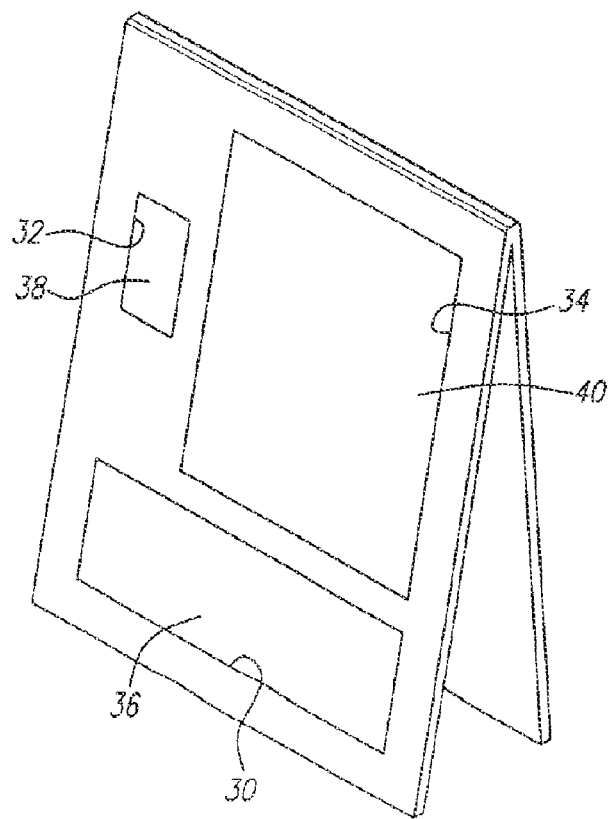
FIG. 6 shows a sample layout of a personalized photo souvenir of the present invention.

A typical final souvenir may be arranged as shown in FIG. 6. The frame may be an easel frame as shown in FIG. 6, or a single-piece frame. The windows may be cut out and sized for various images, and to correspond to the image-editing software templates such that the edited images will be properly sized and shaped to fit into the windows. For example, FIG. 6 shows cut-out windows 30, 32, and 34 for an event ticket 36, spectator photo 38, and an action photo 40 respectively. The size, type, and arrangement of the various images may be altered without departing from the present invention. For example, additional images such as team logos may be placed on the souvenirs. Also, the images may be of a type described in co-pending U.S. application Ser. No. 08/607,582, filed on Feb. 27, 1996, in which the images are a composite photograph image comprising the live action and background spectators with an enlarged view of the selected spectator superimposed with the composite image. By combining the images as described above, a sense of telepresence is thus created, because images of the individual spectators are in a collage-like presentation with images of the live action and other items indicative of the event.

The final souvenirs are sorted, either manually or by computer. For example, software may control which images are sent to which workstation, based on the origin of the images. Thus, it will be known which sectors are handled by each workstation. In this way, the vendors for specified sectors will know which workstations to collect their souvenirs from at step 450, and may then venture out to their assigned sectors and distribute the souvenirs to the spectators at step 460. The spectators will then have a chance to view the souvenir, and will likely be able to find themselves in the spectator photo.

During the event, especially at a sporting event with large picture screens, the spectator images may be displayed along with advertisements and/or instructions on how to obtain the souvenirs. In addition, or alternatively, there may be video units located throughout the venue with software that allows the spectators to search for available spectator photos using simple commands. Even if a spectator fails to obtain a personalized souvenir from the vendor, there may be a walk-up window available at the assembly site (which is preferably at the event venue) for spectators to obtain them. Thus, when a spectator approaches the walk-up window, they may either go through various spectator images available for review, or may simply provide their seating location to the operator. Once the operator has a seating location, the operator can search manually for the proper spectator photo, or the operator may enter the location data into a computer which is programmed to find the proper spectator photo based on the seat number, etc. For example, a database will have each seat number mapped to a specific sector. Then based on the starting photo sector, the number of frames-per-second taken by the camera system 8 or systems, and the particular system 8 used (if more than one was used) to take photos of that sector, the operator or software can determine which frame from which system 8 contains the desired spectator photo. The operator may then locate an existing souvenir with the desired photo, or if none exists then the operator may simply prepare a new souvenir with the desired photo by printing another copy of the desired photo.

If desired, through a separate indexing system similar to that just described, an individual image of a spectator may be manually or automatically extracted and then used to create an inset cameo showing substantially only the spectator. Space for the cameo may exist on a separate frame from that used for the standard personalized souvenirs, or the cameo may be placed instead of any of the other images in the frame designed for the standard personalized souvenirs.

While specific hardware has been described herein, it is understood that other hardware well-known in the art may be used without departing from the inventive concepts described herein. Similarly, though the present invention has been described as taking photos of spectators by taking their photos during the event, the present invention will also apply to taking photos of spectators while in line at the event, and the souvenirs can then be indexed by time, location, or even by a number known to the photographer and to the spectators when taking the picture so that the photographer could convey the information to the spectators. The souvenirs could then be made available at a later time. Thus, while preferred embodiments are illustrated in the drawings and have just been described herein, it will be apparent to those skilled in the art that many modifications can be made to the preferred embodiments without departing from the inventive concepts described. Accordingly, the invention is not to be restricted except by the claims, which follow.

What is claimed is:

1. A method of producing images for spectators of a live action race comprising the steps of:
   obtaining images of various views of a race venue, said images including people and objects within said venue, at least one of said images being obtained by a remotely controlled mobile camera system;
   transferring and storing into a server said obtained images;
   indexing said obtained images according to specific identifiers known to said spectators; and
   making said obtained and indexed images available to said spectators by identifying one of said specific identifiers by which said obtained images are indexed.

2. A method as in claim 1 wherein said remotely controlled mobile camera system is a digital camera system.

3. A method as in claim 1 wherein said specific identifiers are alphanumeric identifiers known to said spectators.

4. A method as in claim 1 further comprising the step of allowing said spectators to select an image they desire among the obtained and indexed images.

5. A method as in claim 4 further comprising the step of printing said desired image.

6. A system for enabling images of a live action race within a race venue to be produced comprising:
   at least one remotely controlled mobile camera system for obtaining images of various views of said race venue including images of people and objects within said venue;
   a server into which the obtained images can be transferred, and by which said obtained images can be indexed according to specific identifiers known to a spectator of said live action race; and
   at least one viewing unit by which the obtained and indexed images can be made available by identifying one of said specific identifiers by which said images are indexed.

7. A system as in claim 6 wherein said remotely controlled mobile camera system is a digital camera system.

8. A system as in claim 6 wherein said server is located at a first location and said viewing unit is located at a second location, remote from said first location.

9. A system as in claim 6 further comprising means for selecting a desired image among the obtained and indexed images.

10. A system as in claim 9 further comprising a color printer for printing said desired image.

11. A system as in claim 6 wherein said specific identifiers comprise alphanumeric identifiers known to said people spectators.

12. A method as in claim 1 wherein said remotely controlled mobile camera system is a pan, tilt and zoom camera system.

13. A method as in claim 1, wherein said people include performers.

14. A method as in claim 1 wherein said people include spectators.

15. A method as in claim 13, wherein said performers include race car drivers.

16. A method as in claim 1 wherein said objects include race cars.

17. A method as in claim 6 wherein said remotely controlled mobile camera system is a pan, tilt and zoom camera system.

18. A method as in claim 6, wherein said people include performers.

19. A method as in claim 6 wherein said people include spectators.

20. A method as in claim 18, wherein said performers include race car drivers.

21. A method as in claim 6 wherein said objects include race cars.

* * * * *